United States Patent
Zeon et al.

(10) Patent No.: US 10,773,789 B2
(45) Date of Patent: Sep. 15, 2020

(54) SKIN-PANEL INTERFACE OF AN AIRCRAFT

(71) Applicant: The Boeing Company, Chicago, IL (US)

(72) Inventors: Young L. Zeon, Edmonds, WA (US); Gerfried R. Achtner, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 437 days.

(21) Appl. No.: 15/644,496

(22) Filed: Jul. 7, 2017

(65) Prior Publication Data

US 2019/0009884 A1 Jan. 10, 2019

(51) Int. Cl.
| | |
|---|---|
| *B64C 3/26* | (2006.01) |
| *B64C 5/02* | (2006.01) |
| *B64C 5/06* | (2006.01) |
| *B64C 3/20* | (2006.01) |

(52) U.S. Cl.
CPC .............. *B64C 3/26* (2013.01); *B64C 5/02* (2013.01); *B64C 5/06* (2013.01); *B64C 3/20* (2013.01)

(58) Field of Classification Search
CPC .... B64C 3/26; B64C 3/18; B64C 5/06; B64C 5/02; B64C 3/20
See application file for complete search history.

(56) References Cited

U.S. PATENT DOCUMENTS

| | | | |
|---|---|---|---|
| 5,346,367 A | 9/1994 | Doolin et al. | |
| 6,180,206 B1 | 1/2001 | Kain, Jr. | |
| 9,415,855 B2 * | 8/2016 | Normand | B64C 3/26 |
| 9,862,479 B1 * | 1/2018 | Charles | B64C 3/26 |
| 2008/0296433 A1 * | 12/2008 | Brenner | B64C 1/12 244/129.1 |
| 2010/0304094 A1 * | 12/2010 | Brook | B29C 70/222 428/174 |
| 2011/0233338 A1 | 9/2011 | Stewart | |

(Continued)

FOREIGN PATENT DOCUMENTS

| | | | | |
|---|---|---|---|---|
| EP | 2070816 | | 6/2009 | |
| EP | 2070816 A2 * | | 6/2009 | B64C 1/12 |

(Continued)

OTHER PUBLICATIONS

US 5,261,675 A1, 07/2001, Hsiao et al. (withdrawn)

(Continued)

*Primary Examiner* — Assres H Woldemaryam
(74) *Attorney, Agent, or Firm* — Kunzler Bean & Adamson

(57) ABSTRACT

A wing or stabilizer of an aircraft. The wing or stabilizer comprises a box portion, comprising at least one spar and an outer skin coupled to the at least one spar. The wing or stabilizer also comprises at least one panel, comprising an outer face-sheet and an inner face-sheet. In a fore-aft direction the outer face-sheet terminates at an outer free edge. In the fore-aft direction the inner face-sheet terminates at an inner free edge. The at least one panel also includes a core sandwiched between the outer face-sheet and the inner face-sheet. The inner face-sheet comprises a cantilevered portion. The cantilevered portion defines the inner free edge. The cantilevered portion is fastened to the outer skin of the box portion.

20 Claims, 6 Drawing Sheets

(56) References Cited

U.S. PATENT DOCUMENTS

| | | | | |
|---|---|---|---|---|
| 2012/0094077 A1* | 4/2012 | Granado Macarrilla | ................... | B64C 3/182 |
| | | | | 428/156 |
| 2013/0233973 A1* | 9/2013 | Nordman | ................ | B64C 1/26 |
| | | | | 244/131 |
| 2015/0014484 A1* | 1/2015 | Zeon | ......................... | B64C 1/26 |
| | | | | 244/131 |
| 2016/0023748 A1* | 1/2016 | Kempshall | ................ | B64B 1/08 |
| | | | | 244/5 |
| 2016/0107432 A1* | 4/2016 | Krajca | ............... | B29D 99/0014 |
| | | | | 156/250 |
| 2016/0244143 A1* | 8/2016 | Foster | ....................... | B64C 3/26 |

FOREIGN PATENT DOCUMENTS

| | | | | |
|---|---|---|---|---|
| EP | 3000719 | | 3/2016 | |
| EP | 3000719 A1 * | | 3/2016 | ............... B64C 3/26 |
| RU | 2111894 | | 5/1998 | |
| WO | 2007071905 | | 6/2007 | |
| WO | 2013108013 | | 7/2013 | |

OTHER PUBLICATIONS

Russian Office Action for Russian Patent Application No. 2018116589/11(025835) dated Mar. 29, 2019.
Extended European Search Report concerning EP Patent Application No. 18170714.2 dated Aug. 23, 2018.
Russian Office Action for Russian Patent Application No. 2018116589/11(025835) dated Jul. 19, 2019.
EPO Communication concerning EP Patent Application No. 18170714.2 dated Mar. 27, 2020.

* cited by examiner

SKIN-PANEL INTERFACE OF AN AIRCRAFT

FIELD

This disclosure relates generally to an aircraft, and more particularly to an interface between an outer skin and a panel of a stabilizer or wing of an aircraft.

BACKGROUND

Some stabilizers and wings of conventional aircraft include a panel (e.g., an edge panel) coupled to the skin of a stabilizer box or wing box. For skins made of metal, some aircraft machined recesses in the skins to receive the panel. However, for skins made of a non-metal, such as a fiber-reinforced polymer material, machining recesses into the skins is impractical due to the potential degradation of the fibers.

One known solution for coupling skins and panels made of fiber-reinforced polymer materials is to indirectly couple the skin of the stabilizer box and the panel with an adapter piece that extended between the panel and the skin (e.g., box skin). Fasteners secured the adapter piece to the panel and separate fasteners secured the adapter piece to the skin. The adapter piece and additional fasteners required to implement this solution added weight and cost to the aircraft.

Another solution aimed to eliminate the adapter piece and reduce the number of fasteners for coupling together skins and panels made of fiber-reinforced polymer materials included the placement of a toughened, low density filler in a gap between the skin and a shallow-angled portion of the panel. The toughened, low density filler is difficult to work with, has a low durability, and is susceptible to damage.

SUMMARY

The subject matter of the present application has been developed in response to the present state of the art, and in particular, in response to the shortcomings of skin-panel interfaces (e.g., box skin to edge panel interfaces) of stabilizers and wings of aircraft that have not yet been fully solved by currently available techniques. Accordingly, the subject matter of the present application has been developed to provide a skin-panel interface that overcomes at least some of the above-discussed shortcomings of prior art techniques.

Disclosed herein is a wing or stabilizer of an aircraft. The wing or stabilizer comprises a box portion, comprising at least one spar and an outer skin coupled to the at least one spar. The wing or stabilizer also comprises at least one panel, comprising an outer face-sheet and an inner face-sheet. In a fore-aft direction the outer face-sheet terminates at an outer free edge. In the fore-aft direction the inner face-sheet terminates at an inner free edge. The at least one panel also includes a core sandwiched between the outer face-sheet and the inner face-sheet. The inner face-sheet comprises a cantilevered portion. The cantilevered portion defines the inner free edge. The cantilevered portion is fastened to the outer skin of the box portion. The preceding subject matter of this paragraph characterizes example 1 of the present disclosure.

The outer face-sheet comprises an outer sheet outer surface. The outer skin comprises a skin outer surface. The outer sheet outer surface of the outer face-sheet is flush with the skin outer surface of the outer skin. The preceding subject matter of this paragraph characterizes example 2 of the present disclosure, wherein example 2 also includes the subject matter according to example 1, above.

The outer skin comprises a skin inner surface, opposite the skin outer surface. The cantilevered portion is fastened to the skin inner surface of the outer skin. The preceding subject matter of this paragraph characterizes example 3 of the present disclosure, wherein example 3 also includes the subject matter according to example 2, above.

The at least one panel further comprises a sealant between the outer free edge of the outer face-sheet and the outer skin of the box portion and between the core of the at least one panel and the outer skin of the box portion. The sealant is flush with the skin outer surface of the outer skin and the outer sheet outer surface of the outer face-sheet. The preceding subject matter of this paragraph characterizes example 4 of the present disclosure, wherein example 4 also includes the subject matter according to example 2 or 3, above.

The at least one panel further comprises a moisture resistant sheet interposed between the outer face-sheet and the core, between the inner face-sheet and the outer skin, and between the core and the outer skin. The preceding subject matter of this paragraph characterizes example 5 of the present disclosure, wherein example 5 also includes the subject matter according to example 4, above.

The inner face-sheet further comprises a base portion and a transition portion, between the base portion and the cantilevered portion. A thickness of the base portion is less than a thickness of the cantilevered portion. A thickness of the transition portion increases from the thickness of the base portion to the thickness of the cantilevered portion. The preceding subject matter of this paragraph characterizes example 6 of the present disclosure, wherein example 6 also includes the subject matter according to any one of examples 1-5, above.

A thickness of the outer face-sheet is equal to the thickness of the base portion of the inner face-sheet. The preceding subject matter of this paragraph characterizes example 7 of the present disclosure, wherein example 7 also includes the subject matter according to example 6, above.

The thickness of the cantilevered portion is constant in the fore-aft direction. The preceding subject matter of this paragraph characterizes example 8 of the present disclosure, wherein example 8 also includes the subject matter according to example 6 or 7, above.

The core is sandwiched between the outer face-sheet and the base portion of the inner face-sheet. The core is sandwiched between the outer face-sheet and the transition portion of the inner face-sheet. The preceding subject matter of this paragraph characterizes example 9 of the present disclosure, wherein example 9 also includes the subject matter according to any one of examples 6-8, above.

The base portion and the cantilevered portion of the inner face-sheet are parallel to the outer face-sheet. The transition portion is oblique to the outer face-sheet. The preceding subject matter of this paragraph characterizes example 10 of the present disclosure, wherein example 10 also includes the subject matter according to any one of examples 6-9, above.

A thickness of the core between the outer face-sheet and the base portion of the inner face-sheet is constant in the fore-aft direction along the at least one panel. A thickness of the core between the outer face-sheet and the transition portion of the inner face-sheet varies in the fore-aft direction along the at least one panel. The preceding subject matter of this paragraph characterizes example 11 of the present disclosure, wherein example 11 also includes the subject matter according to example 10, above.

In the fore-aft direction from the core toward the outer skin, the thickness of the core between the outer face-sheet and the transition portion of the inner face-sheet decreases. The preceding subject matter of this paragraph characterizes example 12 of the present disclosure, wherein example 12 also includes the subject matter according to example 11, above.

In the fore-aft direction from the core toward the outer skin, the thickness of the core between the outer face-sheet and the transition portion of the inner face-sheet increases. The preceding subject matter of this paragraph characterizes example 13 of the present disclosure, wherein example 13 also includes the subject matter according to example 11, above.

An angle defined between the outer face-sheet and the transition portion is less than or equal to 20-degrees. The preceding subject matter of this paragraph characterizes example 14 of the present disclosure, wherein example 14 also includes the subject matter according to any one of examples 10-13, above.

The outer face-sheet, the inner face-sheet, and the outer skin each comprises a plurality of plies each made of a fiber-reinforced polymer material. The preceding subject matter of this paragraph characterizes example 15 of the present disclosure, wherein example 15 also includes the subject matter according to any one of examples 6-14, above.

At least one of the plies of the plurality of plies of the inner face-sheet forms part of the base portion, the transition portion, and the cantilevered portion. The preceding subject matter of this paragraph characterizes example 16 of the present disclosure, wherein example 16 also includes the subject matter according to example 15, above.

The core has a honeycomb structure. The preceding subject matter of this paragraph characterizes example 17 of the present disclosure, wherein example 17 also includes the subject matter according to example 15 or 16, above.

The wing or stabilizer further comprises a plurality of panels. The outer skin comprises a top portion and a bottom portion, opposite the top portion. A first one of the plurality of panels is located on a top side of the stabilizer and the outer free edge and the inner free edge of the first one of the plurality of panels is a leading edge. A second one of the plurality of panels is located on the top side of the stabilizer and the outer free edge and the inner free edge of the second one of the plurality of panels is a trailing edge. A third one of the plurality of panels is located on a bottom side of the stabilizer and the outer free edge and the inner free edge of the third one of the plurality of panels is a leading edge. A fourth one of the plurality of panels is located on the bottom side of the stabilizer and the outer free edge and the inner free edge of the fourth one of the plurality of panels is a trailing edge. The preceding subject matter of this paragraph characterizes example 18 of the present disclosure, wherein example 18 also includes the subject matter according to any one of examples 1-17, above.

Also disclosed is a structure, comprising a first sheet and a panel. The first sheet comprises a plurality of first plies, each made of a first fiber-reinforced polymer material. The panel comprises an outer face-sheet, terminating at an outer free edge and comprising a plurality of second plies, each made of a second fiber-reinforced polymer material. The panel also comprises an inner face-sheet, terminating at an inner free edge and comprising a plurality of third plies, each made of a third fiber-reinforced polymer material. The panel additionally comprises a core sandwiched between the outer face-sheet and the inner face-sheet. The inner face-sheet comprises a cantilevered portion. The cantilevered portion defines the inner free edge. The cantilevered portion is fastened to the first sheet. The preceding subject matter of this paragraph characterizes example 19 of the present disclosure.

Further disclosed herein is an aircraft, comprising a body and stabilizers and wings, coupled to the body. At least one of the stabilizers and wings comprises a box portion, comprising at least one spar and an outer skin coupled to the at least one spar. At least one of the stabilizers and wings also comprises at least one panel, comprising an outer face-sheet, wherein in a fore-aft direction the outer face-sheet terminates at an outer free edge, an inner face-sheet, wherein in the fore-aft direction the inner face-sheet terminates at an inner free edge, and a core sandwiched between the outer face-sheet and the inner face-sheet. The inner face-sheet comprises a cantilevered portion that defines the inner free edge. The cantilevered portion is fastened to the outer skin of the box portion. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
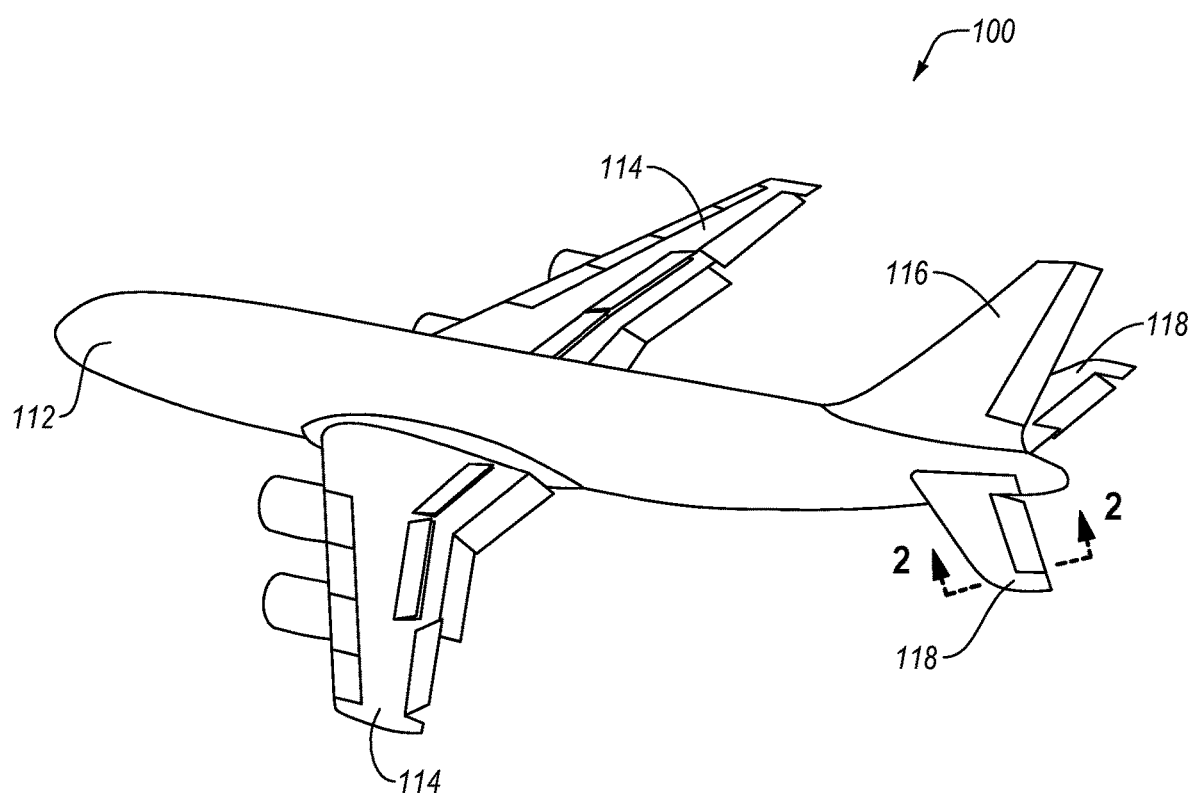
FIG. 1 is a perspective view of an aircraft, according to one or more examples of the present disclosure.

Referring to FIG. 1, one embodiment of an aircraft 100 is shown. The aircraft 100 can be any of various types of aircraft, such as commercial aircraft used for the transportation of passengers, military aircraft for military operations, personal aircraft, fighter jets, and the like. Moreover, although an aircraft is depicted in the illustrated embodiments, in other embodiments, another structure, such as a vehicle (e.g., helicopter, boat, spacecraft, automobile, etc.) or non-mobile complex structure (e.g., building, bridge, machinery, etc.), having a composite structure, can be used instead of the aircraft 100.

The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116. As depicted, the aircraft 100 represents a passenger airplane. Any of various parts of the aircraft 100 include a composite structure. For example, the body 112 of the aircraft 100 includes a composite panel that forms a skin of the body 112 of the aircraft 100. Like the body 112, the wings 114, the vertical stabilizer 116, and the horizontal stabilizers 118 can include a composite structure.

Figure 2:
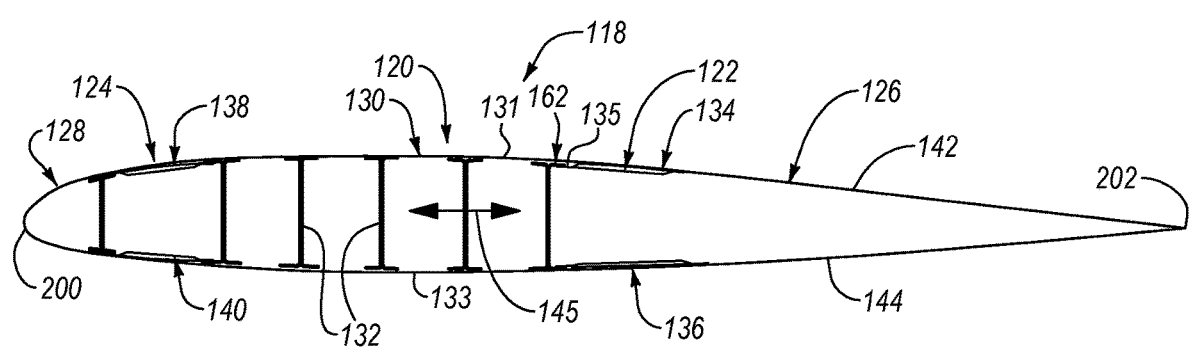
FIG. 2 is a cross-sectional side elevation view of a stabilizer of the aircraft of FIG. 1 taken along line 2-2 of FIG. 1, according to one or more examples of the present disclosure.
Figures 3A, 3B:
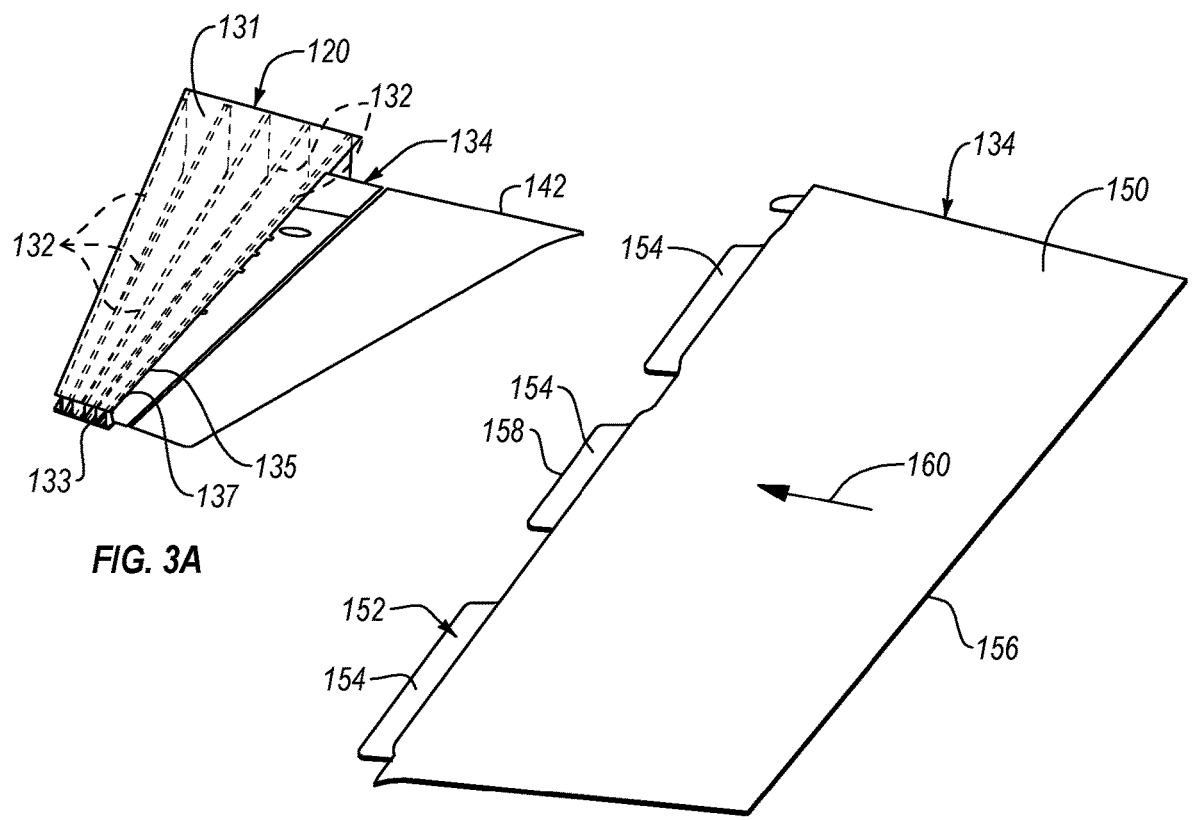
FIG. 3A is a perspective view of an assembly of the stabilizer of FIG. 2 and a detailed perspective view of a panel of the assembly, according to one or more examples of the present disclosure.
FIG. 3B is a detailed perspective view of a portion of a panel of the assembly of FIG. 3A, according to one or more examples of the present disclosure.

Referring to FIG. 2, according to one embodiment, the horizontal stabilizer 118 includes multiple interconnected parts assembled together to form the horizontal stabilizer 118. Although the following proceeds with particular reference to a horizontal stabilizer, it is recognized that the features of the horizontal stabilizer described hereafter may also be applied to a vertical stabilizer and/or wings of an aircraft without departing from the essence of the present disclosure. The horizontal stabilizer 118 of FIG. 2 includes a box portion 120, which can be otherwise defined as a stabilizer box. The box portion 120 includes multiple spars 132 each extending lengthwise in a spanwise direction from the body 112 to a tip of the stabilizer 118 (see, e.g., FIGS. 2, 3A, and 3B). The spars 132 are spaced apart from each other in a fore-aft direction 145, which is parallel with a central axis of the body 112. Generally, the stabilizer 118 extends in the fore-aft direction 145 between a leading edge 200 of the stabilizer 118 and a trailing edge 202 of the stabilizer 118. Each of the spars 132 has a central web and opposing flanges at a top and bottom of the central web, such that a cross-section of each of the spars 132 is substantially I-shaped.

The box portion 120 further includes an outer skin 130 coupled to the spars 132. More specifically, the outer skin 130 of the box portion 120 includes a top portion 131 coupled to a top of the spars 132 and a bottom portion 133 coupled to a bottom of the spars 132. The top portion 131 and the bottom portion 133 of the outer skin 130 are spaced apart from each other by the spars 132 such that a gap (e.g., hollow cavity) is defined between the top portion 131 and the bottom portion 133 of the outer skin 130. A leading edge portion and a trailing edge portion of the top portion 131 and the bottom portion 133 of the outer skin 130 overhang the foremost one and aftmost one of the spars 132 such that the leading edge portions and the trailing edge portions of the outer skin 130 are cantilevered. The outer skin 130 includes a skin outer surface 174 and skin inner surface 175, opposite the skin outer surface 174. A fourth thickness t4 of the outer skin 130 is defined as the shortest distance between the skin outer surface 174 and the skin inner surface 175 at a given location of the outer skin 130. In some implementations, the fourth thickness t4 of the outer skin 130 is constant along the outer skin 130 in the fore-aft direction 145.

The horizontal stabilizer 118 also includes multiple panels 134, 136, 138, 140 respectively coupled to the leading edge portions and trailing edge portions of the outer skin 130. The panels 134, 136 cooperatively form a trailing edge portion 122 of the horizontal stabilizer 118. The panels 138, 140 cooperatively form an auxiliary box portion 124 of the horizontal stabilizer 118. According to some embodiments, each one of the panels 136, 138, 140 is configured in a manner similar to the panel 134 shown in FIGS. 3A-6. Therefore, the features of the panels 136, 138, 140, and corresponding configuration of the skin-panel interface between the panels 136, 138, 140 and the outer skin 130, can be determined from the features of the panel 134, and corresponding configuration of the skin-panel interface 162 between the panel 134 and the outer skin 130. For this reason, the features of the panels of the horizontal stabilizer 118 will be described with reference to the panel 134, knowing the description of the panel 134 may also apply to the panels 136, 138, 140. It is also recognized that, according to some embodiments, each one of the vertical stabilizer 116 and the wings 114 can be configured in a manner similar to the horizontal stabilizer 118. Therefore, the features of the vertical stabilizer 116 and/or the wings 114 can be determined from the features of the horizontal stabilizer 118. For this reason, the features of the vertical stabilizer 116 and the wings 114 can be described with reference to the horizontal stabilizer 118, knowing the description of the horizontal stabilizer 118 may also apply to the vertical stabilizer 116 and the wings 114.

As shown in FIG. 2, the panel 134 is coupled to the top portion 131 (or top side) of the outer skin 130 at a trailing edge portion 135 of the top portion 131 of the outer skin 130. In a similar manner, the panel 136 is coupled to a bottom portion 133 (or bottom side) of the outer skin 130 at a trailing edge portion of the bottom portion 133 of the outer skin 130, the panel 138 is coupled to the top portion 131 of the outer skin 130 at a leading edge portion of the top portion 131 of the outer skin 130, and the panel 140 is coupled to the bottom portion 133 of the outer skin 130 at a leading edge portion of the bottom portion 133 of the outer skin 130. As presented above, the panels 136, 138, 140 are coupled to the outer skin 130 in the same manner as the panel 134, which is described in more detail below.

Also shown in FIG. 2, the horizontal stabilizer 118 further includes a leading edge portion 128 and an elevator portion 126. The leading edge portion 128 defines the leading edge 200 of the horizontal stabilizer 118 and is coupled to the panels 138, 140 of the auxiliary box portion 124. The elevator portion 126 defines the trailing edge 202 of the horizontal stabilizer 118 and is coupled to the panels 134, 136 of the trailing edge portion 122. The elevator portion 126 includes two elevator panels 142, 144 that converge at the trailing edge 202. Furthermore, the elevator portion 126 includes a high-lift surface or other aerodynamic control surface that is adjustable to control flight characteristics of the aircraft 100.

Figure 4:
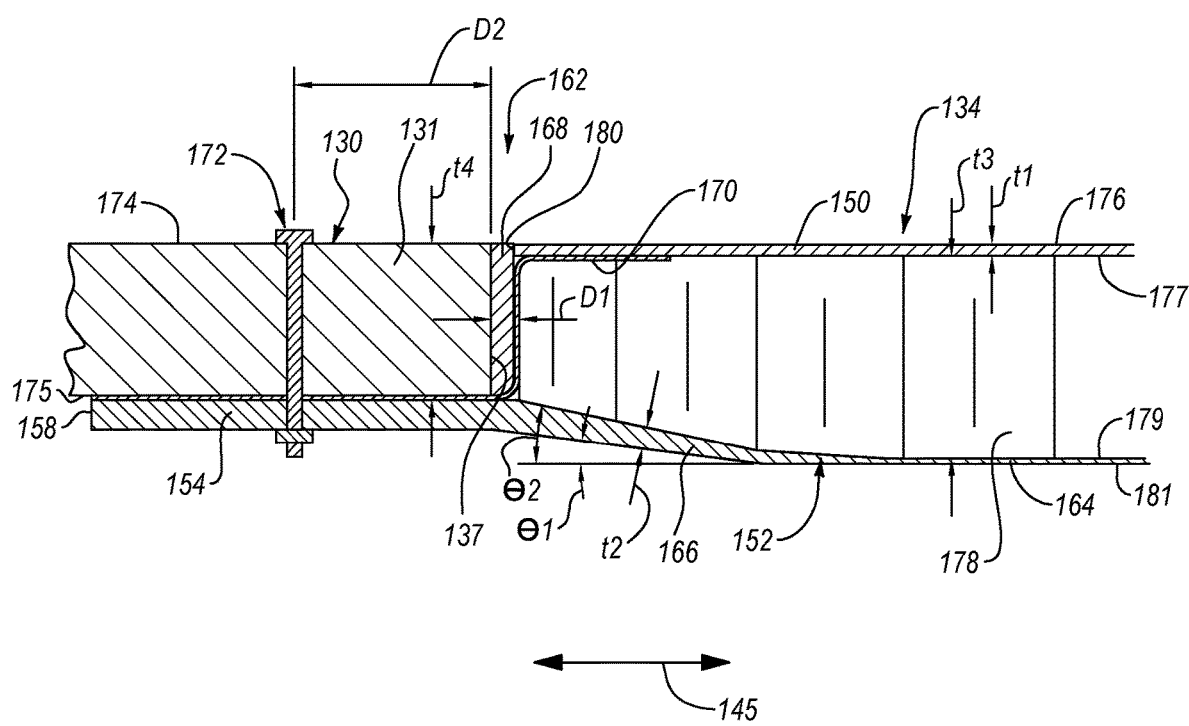
FIG. 4 is a cross-sectional side elevation view of a skin-panel interface of the stabilizer of FIG. 2, according to one or more examples of the present disclosure.

Referring to FIG. 4, the panel 134 is shown coupled to the outer skin 130. The panel 134 includes an outer face-sheet 150, and inner face-sheet 152, and a core 178 sandwiched between the outer face-sheet 150 and the inner face-sheet 152. The outer face-sheet 150 is termed an "outer" face-sheet because the outer face-sheet 150 faces an outside or exterior of the horizontal stabilizer 118. In contrast, the inner face-sheet 152 is termed an "inner" face-sheet because the inner face-sheet 152 faces an inside or interior of the horizontal stabilizer 118. Moreover, as used herein the term "outer" is used to describe a feature that is closer to an outside or exterior of the horizontal stabilizer 118 than a feature described with the term "inner."

In a fore-aft direction 145 (i.e., when moving along the panel 134 in the fore-aft direction), at a first end of the outer face-sheet 150, the outer face-sheet 150 terminates at an outer free edge 180. In the illustrated embodiment of FIG. 4, the first end of the outer face-sheet 150 is a leading end of the outer face-sheet 150, and a second end (not shown) of the outer face-sheet 150, opposite the first end, is a trailing end of the outer face-sheet 150. Accordingly, the outer free edge 180 is located at and defined by the leading end of the outer face-sheet 150. The use of the terms "leading" and "trailing" are tied to an intended direction of motion of the aircraft 100 during flight. In other words, a "leading" feature leads the "trailing" feature during flight of the aircraft 100. Also, the fore-aft direction 145 is defined at a direction extending between a fore end of the aircraft 100 and an aft end of the aircraft 100. In other words, the fore-aft direction 145 is substantially parallel to a central axis of the body 112 of the aircraft 100. The fore-aft direction 145 may also be parallel to a chord of the horizontal stabilizer 118. Accordingly, the fore-aft direction 145 is substantially transverse to a span of the horizontal stabilizer 118. In some implementations, the outer face-sheet 150 is continuous (e.g., without a break) along the panel 134 in the fore-aft direction 145 from the leading end of the outer face-sheet 150 to the trailing end of the outer face-sheet 150.

The outer face-sheet 150 defines an outer sheet outer surface 176 and an outer sheet inner surface 177, opposite the outer sheet outer surface 176. A first thickness t1 of the outer face-sheet 150 is defined as the shortest distance between the outer sheet outer surface 176 and the outer sheet inner surface 177 at a given location of the outer face-sheet 150. In some implementations, the first thickness t1 of the outer face-sheet 150 is constant along the outer face-sheet 150 in the fore-aft direction 145.

In the fore-aft direction 145, at a first end of the inner face-sheet 152, the inner face-sheet 152 terminates at an inner free edge 158. In the illustrated embodiment of FIG. 4, the first end of the inner face-sheet 152 is a leading end of the inner face-sheet 152, and a second end (not shown) of the inner face-sheet 152, opposite the first end, is a trailing end of the inner face-sheet 152. Accordingly, the inner free edge 158 is located at and defined by the leading end of the inner face-sheet 152. The inner face-sheet 152 defines an inner sheet outer surface 179 and an inner sheet inner surface 181, opposite the inner sheet outer surface 179. A second thickness t2 of the inner face-sheet 152 is defined as the shortest distance between the inner sheet outer surface 179 and the inner sheet inner surface 181 at a given location of the inner face-sheet 152.

The inner face-sheet 152 is continuous (e.g., without a break) along the panel 134 in the fore-aft direction 145 from the leading end of the inner face-sheet 152 to the trailing end of the inner face-sheet 152. The inner face-sheet 152 includes a base portion 164, a transition portion 166, and a cantilevered portion 154. In the fore-aft direction 145, the transition portion 166 is between the base portion 164 and the cantilevered portion 154. In other words, in the fore-aft direction 145, going from the trailing end of the inner face-sheet 152 to the leading end of the inner face-sheet 152, the inner face-sheet 152 transitions from the base portion 164 to the transition portion 166 to the cantilevered portion 154. The base portion 164, the transition portion 166, and the cantilevered portion 154 are defined, in part, by the characteristics of the second thickness t2 of the base portion 164, the transition portion 166, and the cantilevered portion 154. The second thickness t2 of the inner face-sheet 152 varies along the inner face-sheet 152 in the fore-aft direction 145. More specifically, the second thickness t2 of the base portion 164 is constant in the fore-aft direction 145, the second thickness t2 of the cantilevered portion 154 is constant in the fore-aft direction 145, and the second thickness t2 of the transition portion 166 increases from the base portion 164 to the cantilevered portion 154. The rate of change of the second thickness t2 of the transition portion 166 can be constant in the fore-aft direction 145. In one implementation, the second thickness t2 of the base portion 164 is equal to the first thickness t1 of the outer face-sheet 150 and the second thickness t2 of the cantilevered portion 154 is greater than the second thickness t2 of the base portion 164. According to some implementations, the second thickness t2 of the cantilevered portion 154 is at least 3 times greater than the second thickness t2 of the base portion 164. For example, in one implementation, the base portion 164 has three plies and the cantilevered portion 154 has 13 plies.

In the illustrated embodiment, the base portion 164 and the cantilevered portion 154 of the inner face-sheet 152 are substantially parallel to each other, and parallel to the outer face-sheet 150 in some implementations. For example, in one implementation, an entirety of the outer face-sheet 150 at its leading end is parallel to one, two, or all of the outer skin 130, the cantilevered portion 154, and the base portion 164. In contrast, the transition portion 166 of the inner face-sheet 152 is oblique to the base portion 164 and the cantilevered portion 154 of the inner face-sheet 152, as well as the outer face-sheet 150 and the outer skin 130. The inner sheet inner surface 181 of the transition portion 166 defines a first angle θ1 with respect to the inner sheet inner surface 181 of the base portion 164. Similarly, the inner sheet outer surface 179 of the transition portion 166 defines a second angle θ2 with respect to the inner sheet inner surface 181 of the base portion 164. In one implementation, the first angle θ1 is less than the second angle θ2. Moreover, according to certain implementations, the second angle θ2 equal to or less than 20°.

The outer free edge 180 of the outer face-sheet 150 and the inner free edge 158 of the inner face-sheet 152 are considered "free edges" because they are not directly coupled to each other. In other words, at the leading end of the panel 134, the outer free edge 180 and the inner free edge 158 terminate at locations spaced apart from each other. Accordingly, at the leading end of the panel 134, no portion of the outer face-sheet 150 contacts the inner face-sheet 152, and vice versa.

Figure 5:
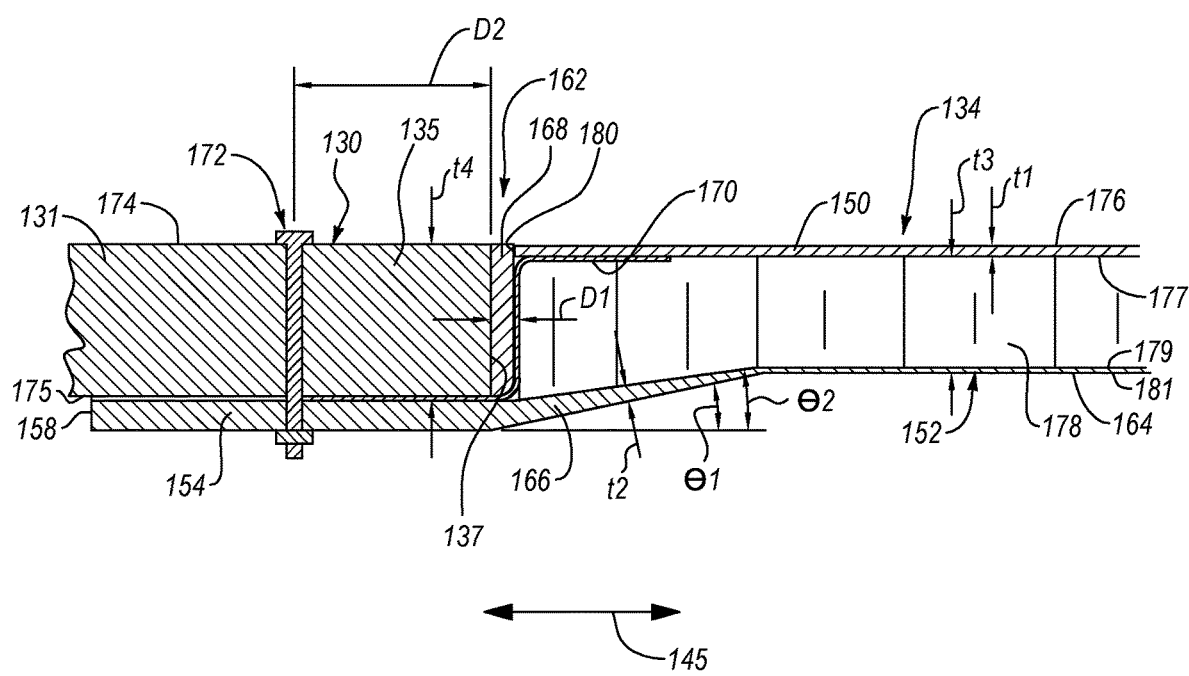
FIG. 5 is a cross-sectional side elevation view of a skin-panel interface of a stabilizer of an aircraft, according to one or more examples of the present disclosure.

The core 178 is sandwiched between the outer face-sheet 150 and the base portion 164 and the transition portion 166 of the inner face-sheet 152. In some implementations, the core 178 is sandwiched directly between the outer face-sheet 150 and the base portion 164 and the transition portion 166, such that no other layers are interposed between the core 178 and at least a portion of the outer face-sheet 150 and between the core 178 and at least portions of the base portion 164 and the transition portion 166. The core 178 has a third thickness t3 defined as the shortest distance between the outer face-sheet 150 and the inner face-sheet 152 at a given location of the core 178. In some implementations, the third thickness t3 of the core 178 is constant along between the outer face-sheet 150 and the base portion 164 of the inner face-sheet 152 in the fore-aft direction 145. The third thickness t3 depends on a desired strength of the panel 134 for any given application. Generally, the thicker the core 178, the stronger the panel 134. Accordingly, in some implementations, the panel 134 shown in FIG. 4 is stronger than the panel 134 shown in FIG. 5 because the third thickness t3 of the panel 134 of FIG. 4 is greater than the third thickness t3 of the panel 134 of FIG. 5. However, the panel 134 shown in FIG. 5 is lighter than the panel 134 shown in FIG. 4 due to the reduced material associated with the thinner core 178.

However, the third thickness t3 of the core 178 between the outer face-sheet 150 and the transition portion 166 of the inner face-sheet 152 varies in the fore-aft direction 145. For example, in FIG. 4, the third thickness t3 of the core 178 decreases in the fore-aft direction 145 from the base portion 164 to the cantilevered portion 154. However, in another example, as shown in FIG. 5, the third thickness t3 of the core 178 increases in the fore-aft direction 145 from the base portion 164 to the cantilevered portion 154. In some implementations, whether the third thickness t3 of the core 178 increases or decreases in the fore-aft direction 145 from the base portion 164 to the cantilevered portion 154 depends on an overall thickness of the panel 134 along the base portion 164 of the panel 134.

The cantilevered portion 154 of the inner face-sheet 152 is considered "cantilevered" because the cantilevered portion 154 is not directly coupled to the core 178 or the outer face-sheet 150. Furthermore, the cantilevered portion 154 of the inner face-sheet 152 is considered "cantilevered" because, prior to assembly with the outer skin 130 of the box portion 120, only one end of the cantilevered portion 154 is anchored to the transition portion 166 of the inner face-sheet 152, the core 178, and the outer face-sheet 150 of the panel 134. For example, no portion of the outer face-sheet 150 is directly coupled, bonded, adhered, or co-formed to the cantilevered portion 154.

The panel 134 is coupled to the outer skin 130, to form the skin-panel interface 162, by fastening the cantilevered portion 154 of the panel 134 to the outer skin 130. More specifically, the inner sheet outer surface 179 of the cantilevered portion 154 is fastened to the skin inner surface 175 of the outer skin 130. In this manner, the cantilevered portion 154 is located inward of the outer skin 130 when fastened to the outer skin 130. In one implementation, the cantilevered portion 154 is fastened to the outer skin 130 via a fastener 172 that extends through aligned apertures in the outer skin 130 and the cantilevered portion 154. The fastener 172 can be any of various fasteners, such as, for example, nut-and-bolt assembly, rivet, and the like. The fastener 172 extends through the outer skin 130 at a location a second distance D2 away from a trailing edge 137 of the outer skin 130. The second distance D2 corresponds with a distance sufficiently small, to maintain the portion of the cantilevered portion 154 between the fastener 172 and the trailing edge 137 against the outer skin 130, and sufficiently large to promote the strength of the outer skin 130 at the aperture through which the fastener 172 extends. In certain implementations, the second distance D2 is kept as low as possible to promote the overall strength of the skin-panel interface while meeting the required strength of the outer skin 130 in the spanwise direction. The second distance D2 can be expressed in terms of the diameter (d) of the fastener 172 (e.g., 2 times the diameter d or 3 times the diameter d). In one implementation, the second distance D2 is between 2.5 times the diameter d and 3 times the diameter d, inclusive.

In some implementations, when the panel 134 is fastened to the outer skin 130, the outer sheet outer surface 176 of the outer face-sheet 150 is flush with the skin outer surface 174 of the outer skin 130. In this manner, a substantially continuous aerodynamic surface, with minimal to no flow obstructions, is formed between the outer skin 130 and the panel 134.

According to some implementations, the skin-panel interface 162 of the horizontal stabilizer 118 further includes a moisture resistant sheet 170. Referring to FIGS. 4 and 5, the moisture resistant sheet 170 is arranged in the skin-panel interface 162 to prevent, or at least restrict, entry of moisture into the core 178 from the gap between the trailing edge 137 of the outer skin 130 and the core 178. More specifically, the moisture resistant sheet 170 is interposed between the outer face-sheet 150 and the core 178, between the cantilevered portion 154 of the inner face-sheet 152 and the outer skin 130, and between the core 178 and the trailing edge 137 of the outer skin 130. In some implementations, the moisture resistant sheet 170 extends along only a portion of the outer sheet inner surface 177 of the outer face-sheet 150 and extends along an entirety of the inner sheet outer surface 179 of the cantilevered portion 154 of the inner face-sheet 152.

Assembly of the skin-panel interface 162 includes positioning a first portion of the moisture resistant sheet 170 or barrier between the outer face-sheet 150 and the core 178 and then coupling the outer face-sheet 150 to the core 178 to effectively sandwich the first portion of the moisture resistant sheet 170 between the outer face-sheet 150 and the core 178. Similarly, assembly of the skin-panel interface 162 includes positioning a second portion of the moisture resistant sheet 170 between the cantilevered portion 154 and the outer skin 130 and then passing the fastener 172 through the outer skin 130, the second portion of the moisture resistant sheet 170, and the cantilevered portion 154 to effectively sandwich the second portion of the moisture resistant sheet 170 between the outer skin 130 and the cantilevered portion 154. Additionally, the moisture resistant sheet 170 is interposed between a sealant 168, in the gap between the trailing edge 137 of the outer skin 130 and the core 178, and a leading end of the core 178. The moisture resistant sheet 170 can be made from any of various materials, such as fiberglass, foam adhesive, and the like, that promote a resistance to moisture and erosion. However, in some implementations, a moisture resistant sheet is not used. Rather, to prevent, or at least restrict, entry of moisture into the core 178, in such implementations and depending on the moisture environment, a structural sealant (e.g., a foam adhesive) is applied to the exposed edge of the core 178.

As mentioned above, the skin-panel interface 162 includes a gap between the outer free edge 180 of the outer face-sheet 150 and the trailing edge 137 of the outer skin 130 and between the leading end of the core 178 and the trailing edge 137 of the outer skin 130. The gap extends lengthwise along the span of the panel 134 and the outer skin 130, and has a width equal to the first distance D1. To seal the gap and provide an aerodynamic surface, the sealant 168 is positioned within the gap and effectively fills the gap. An outermost surface of the sealant 168 is substantially flush with the skin outer surface 174 of the outer skin 130 and the outer sheet outer surface 176 of the outer face-sheet 150. The sealant 168 is made of any of various materials, such as polymers, foams, adhesives, and the like. Although not shown, additional layers, such as sealant layers, paint layers, and the like, may be applied onto the sealant 168, the skin outer surface 174 of the outer skin 130, and the outer sheet outer surface 176 of the outer face-sheet 150 as desired. The first distance D1 is approximately equal to the distance between the outer free edge 180 and the trailing edge of the outer skin 130, which are in relatively close proximity to each other.

The angle and taper of the transition portion 166 of the inner face-sheet 152 of the panel 134 depends, at least in part, on one or more of the third thickness t3 of the core 178, the second distance D2, the second thickness t2 of the cantilevered portion 154 of the inner face-sheet 152, and the second thickness t2 of the base portion 164. For example, the higher the ratio between the second thickness t2 of the cantilevered portion 154 and the base portion 164, the greater the taper of the transition portion 166. Also, as another example, the greater the difference between the fourth thickness t4 of the outer skin 130 and the third thickness t3 of the core 178, the greater the angle of the transition portion 166. According to yet another example, because the bending moment in the cantilevered portion 154 increases with an increase in the second distance D2, the higher the second distance D2, the thicker the cantilevered portion 154 and thus the more tapered and longer the transition portion 166.

Figure 6:
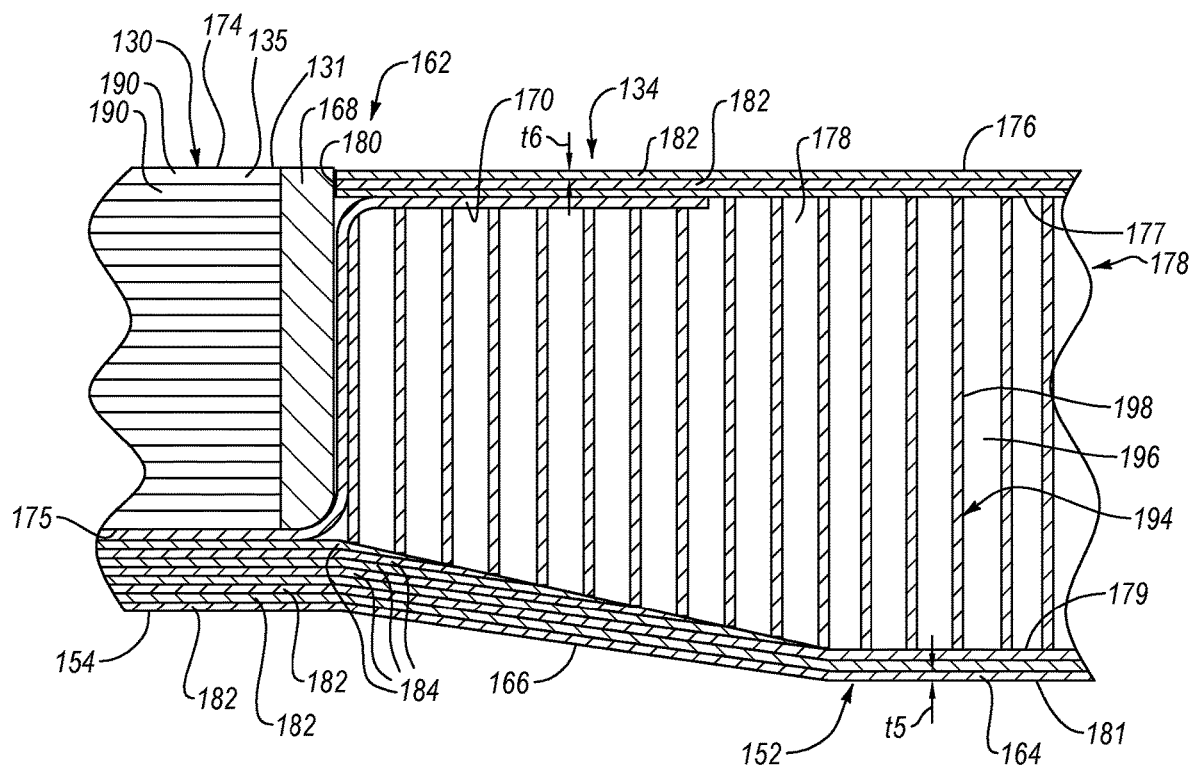
FIG. 6 is a detailed cross-sectional side elevation view of the skin-panel interface of FIG. 4, according to one or more examples of the present disclosure.

Referring to FIG. 6, each one of the outer face-sheet 150, the inner face-sheet 152, and the outer skin 130 includes a plurality of plies. The outer face-sheet 150 includes a plurality of plies 182 and the inner face-sheet 152 includes a plurality of plies 182 and a plurality of plies 184. The outer skin 130 includes a plurality of plies 190. The plurality of plies 182, 184 of each of the outer face-sheet 150 and the inner face-sheet 152, respectively, are adhered or bonded to each other to form a laminated or multi-ply structure. Similarly, the plurality of plies 190 of the outer skin 130 are adhered or bonded to each other to form a laminated or multi-ply structure. Each ply of the plurality of plies 182, 184, 190 is made of a fiber-reinforced polymer material, such as a carbon fiber reinforced polymer material, fiberglass, and the like. More specifically, each ply of the plurality of plies 182, 184, 190 includes fibers embedded or suspended in a thermoset polymer matrix, such as a resin, epoxy, etc. The fibers and matrices of the plurality of plies 182, 184, 190 can be the same as each other or different from one another.

Generally, in some implementations, the fibers of each ply of the plurality of plies 182, 184, 190 are unidirectional. In such implementations, adjacent plies of the plurality of plies 182, 184, 190 may be oriented relative to each other such that the direction of the fibers of the adjacent plies are different. For example, in certain implementations, orientation of the fibers of the plurality of plies 182, 184 of each of the outer face-sheet 150 and the inner face-sheet 152 and the plurality of plies 190 of the outer skin 130 may alternate from ply to ply across a thickness of the outer face-sheet 150, the inner face-sheet 152, and the outer skin 130, respectively. The thickness of the outer face-sheet 150, the inner face-sheet 152, and the outer skin 130 is approximately equal to the sum of the fifth thicknesses t5 of the plurality of plies 182, 184, 190 forming the outer face-sheet 150, the inner face-sheet 152, and the outer skin 130, respectively.

The tapering of the transition portion 166 of the inner face-sheet 152 is facilitated by the addition of the plurality of plies 184 to the plurality of plies 182 forming the base portion 164 of the inner face-sheet 152. In the illustrated implementation, the base portion 164 of the inner face-sheet 152 includes the same number of plies 182, and thus has the same thickness, as the outer face-sheet 150. To promote the transition from the thinner base portion 164 to the thicker cantilevered portion 154, supplemental plies 184 are introduced at different points along the transition portion 166, in a direction toward the cantilevered portion 154, that correspond with a desired taper of the transition portion 166. Moreover, the number of supplemental plies 184 added to the plurality of plies 182 of the base portion 164 corresponds with the desired second thickness t2 of the cantilevered portion 154 of the inner face-sheet 152.

The core 178 has a honeycomb structure 194 in one implementation. For example, the honeycomb structure 194 includes a plurality of cells 198 each defining a hollow cavity 196. The cells 198 extend lengthwise in a direction transverse to the fore-aft direction 145 and the outer face-sheet 150. In other words, the cells 198 extend lengthwise in a direction across a thickness of the core 178. The wall of each of the cells 198 defines a wall of an adjacent one of the cells 198 such that the cells 198 are interconnected together. The cells 198 can have any of various shapes. In one implementation, each of the cells 198 has a hexagonal shape. In other implementations, each of the cells 198 has a shape other than hexagonal, such as circular, triangular, rectangular, square, and the like.

Although the outer skin 130 and the panel 134 are described herein with specific reference to stabilizers and/or wings of an aircraft, in other embodiments, the outer skin 130 and the panel 134 define other parts of any of various other structures without departing from the essence of the present disclosure.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A wing or stabilizer of an aircraft, comprising:
    a box portion, comprising at least one spar and an outer skin coupled to the at least one spar; and
    at least one panel, comprising:
        an outer face-sheet, wherein in a fore-aft direction the outer face-sheet terminates at an outer free edge;
        an inner face-sheet, wherein in the fore-aft direction the inner face-sheet terminates at an inner free edge; and
        a core sandwiched between the outer face-sheet and the inner face-sheet;
    wherein:
        the inner face-sheet comprises a cantilevered portion;
        the cantilevered portion defines the inner free edge;
        the cantilevered portion is fastened to the outer skin of the box portion;
        the inner face-sheet further comprises:
            a base portion; and
            a transition portion, between the base portion and the cantilevered portion;
        a thickness of the base portion is less than a thickness of the cantilevered portion; and
        a thickness of the transition portion increases from the thickness of the base portion to the thickness of the cantilevered portion.

2. The wing or stabilizer according to claim 1, wherein:
    the outer face-sheet comprises an outer sheet outer surface;
    the outer skin comprises a skin outer surface; and
    the outer sheet outer surface of the outer face-sheet is flush with the skin outer surface of the outer skin.

3. The wing or stabilizer according to claim 2, wherein:
    the outer skin comprises a skin inner surface, opposite the skin outer surface; and
    the cantilevered portion is fastened to the skin inner surface of the outer skin.

4. The wing or stabilizer according to claim 2, wherein:
    the at least one panel further comprises a sealant between the outer free edge of the outer face-sheet and the outer skin of the box portion and between the core of the at least one panel and the outer skin of the box portion; and
    the sealant is flush with the skin outer surface of the outer skin and the outer sheet outer surface of the outer face-sheet.

5. The wing or stabilizer according to claim 4, wherein the at least one panel further comprises a moisture resistant sheet interposed between the outer face-sheet and the core, between the inner face-sheet and the outer skin, and between the core and the outer skin.

6. The wing or stabilizer according to claim 1, wherein a thickness of the outer face-sheet is equal to the thickness of the base portion of the inner face-sheet.

7. The wing or stabilizer according to claim 1, wherein the thickness of the cantilevered portion is constant in the fore-aft direction.

8. The wing or stabilizer according to claim 1, wherein:
the core is sandwiched between the outer face-sheet and the base portion of the inner face-sheet; and
the core is sandwiched between the outer face-sheet and the transition portion of the inner face-sheet.

9. The wing or stabilizer according to claim 1, wherein:
the base portion and the cantilevered portion of the inner face-sheet are parallel to the outer face-sheet; and
the transition portion is oblique to the outer face-sheet.

10. The wing or stabilizer according to claim 9, wherein:
a thickness of the core between the outer face-sheet and the base portion of the inner face-sheet is constant in the fore-aft direction along the at least one panel; and
a thickness of the core between the outer face-sheet and the transition portion of the inner face-sheet varies in the fore-aft direction along the at least one panel.

11. The wing or stabilizer according to claim 10, wherein, in the fore-aft direction from the core toward the outer skin, the thickness of the core between the outer face-sheet and the transition portion of the inner face-sheet decreases.

12. The wing or stabilizer according to claim 10, wherein, in the fore-aft direction from the core toward the outer skin, the thickness of the core between the outer face-sheet and the transition portion of the inner face-sheet increases.

13. The wing or stabilizer according to claim 9, wherein an angle defined between the outer face-sheet and the transition portion is less than or equal to 20-degrees.

14. The wing or stabilizer according to claim 1, wherein the outer face-sheet, the inner face-sheet, and the outer skin each comprises a plurality of plies each made of a fiber-reinforced polymer material.

15. The wing or stabilizer according to claim 14, wherein at least one of the plies of the plurality of plies of the inner face-sheet forms part of the base portion, the transition portion, and the cantilevered portion.

16. The wing or stabilizer according to claim 14, wherein the core has a honeycomb structure.

17. The wing or stabilizer according to claim 1, further comprising a plurality of panels, wherein:
the outer skin comprises a top portion and a bottom portion, opposite the top portion;
a first one of the plurality of panels is located on a top side of the stabilizer and the outer free edge and the inner free edge of the first one of the plurality of panels is a leading edge;
a second one of the plurality of panels is located on the top side of the stabilizer and the outer free edge and the inner free edge of the second one of the plurality of panels is a trailing edge;
a third one of the plurality of panels is located on a bottom side of the stabilizer and the outer free edge and the inner free edge of the third one of the plurality of panels is a leading edge; and
a fourth one of the plurality of panels is located on the bottom side of the stabilizer and the outer free edge and the inner free edge of the fourth one of the plurality of panels is a trailing edge.

18. An aircraft, comprising:
a body; and
stabilizers and wings, coupled to the body and at least one of the stabilizers and wings comprises:
a box portion, comprising at least one spar and an outer skin coupled to the at least one spar; and
at least one panel, comprising:
an outer face-sheet, wherein in a fore-aft direction the outer face-sheet terminates at an outer free edge;
an inner face-sheet, wherein in the fore-aft direction the inner face-sheet terminates at an inner free edge; and
a core sandwiched between the outer face-sheet and the inner face-sheet;
wherein:
the inner face-sheet comprises a cantilevered portion;
the cantilevered portion defines the inner free edge;
the cantilevered portion is fastened to the outer skin of the box portion;
the inner face-sheet further comprises:
a base portion; and
a transition portion, between the base portion and the cantilevered portion;
a thickness of the base portion is less than a thickness of the cantilevered portion; and
a thickness of the transition portion increases from the thickness of the base portion to the thickness of the cantilevered portion.

19. The aircraft according to claim 18, wherein:
the outer face-sheet comprises an outer sheet outer surface;
the outer skin comprises a skin outer surface; and
the outer sheet outer surface of the outer face-sheet is flush with the skin outer surface of the outer skin.

20. The aircraft according to claim 19, wherein:
the at least one panel further comprises a sealant between the outer free edge of the outer face-sheet and the outer skin of the box portion and between the core of the at least one panel and the outer skin of the box portion; and
the sealant is flush with the skin outer surface of the outer skin and the outer sheet outer surface of the outer face-sheet.

* * * * *